United States Patent
Srinivasan et al.

(10) Patent No.: US 12,086,114 B2
(45) Date of Patent: Sep. 10, 2024

(54) ASYNCHRONOUS METADATA REPLICATION AND MIGRATION BETWEEN COMPUTE SITES

(71) Applicant: Cisco Technology, Inc., San Jose, CA (US)

(72) Inventors: Vishwas Muthur Srinivasan, Belmont, CA (US); Rajesh Rajashekar, Mountain House, CA (US); Junxu Li, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 189 days.

(21) Appl. No.: 17/865,265

(22) Filed: Jul. 14, 2022

(65) Prior Publication Data
US 2023/0334026 A1 Oct. 19, 2023

Related U.S. Application Data

(60) Provisional application No. 63/331,726, filed on Apr. 15, 2022.

(51) Int. Cl.
*G06F 16/21* (2019.01)
(52) U.S. Cl.
CPC .................. *G06F 16/214* (2019.01)
(58) Field of Classification Search
CPC ... G06F 16/214; G06F 16/119; H04L 67/1095
See application file for complete search history.

(56) References Cited

U.S. PATENT DOCUMENTS

| | | | |
|---|---|---|---|
| 2016/0092132 A1 | 3/2016 | Hildebrand et al. |
| 2016/0173590 A1 | 6/2016 | Pohjoisvirta et al. |
| 2019/0042595 A1 | 2/2019 | Basham et al. |
| 2019/0278483 A1 | 9/2019 | Mahmood et al. |

FOREIGN PATENT DOCUMENTS

WO  WO2016141702 A1  9/2016

OTHER PUBLICATIONS

Brief Introduction to Database Migration (Year: 2020).*

* cited by examiner

*Primary Examiner* — Jorge A Casanova
(74) *Attorney, Agent, or Firm* — Lee & Hayes, P.C.

(57) ABSTRACT

In one embodiment, systems and methods for performing asynchronous local migration of metadata between data stores and asynchronous remote replication of metadata between sites are described. The methods may use various configurations, including 1-to-1, 1-to-N, N-to-1, M-to-N, etc. The method for performing asynchronous local migration at a first site may include pausing critical operation(s) at an old data store, copying metadata from the old data store to a new data store, flagging table(s) in the old data store as complete, and deleting the metadata from the old data store. The method for asynchronous remote replication may include determining that local migration is complete, identifying second metadata from the new data store for which the first site is a primary authority, sending, to the second site, the second metadata, receiving, from the second site, third metadata for which the second site is the primary authority and storing the third metadata.

17 Claims, 9 Drawing Sheets

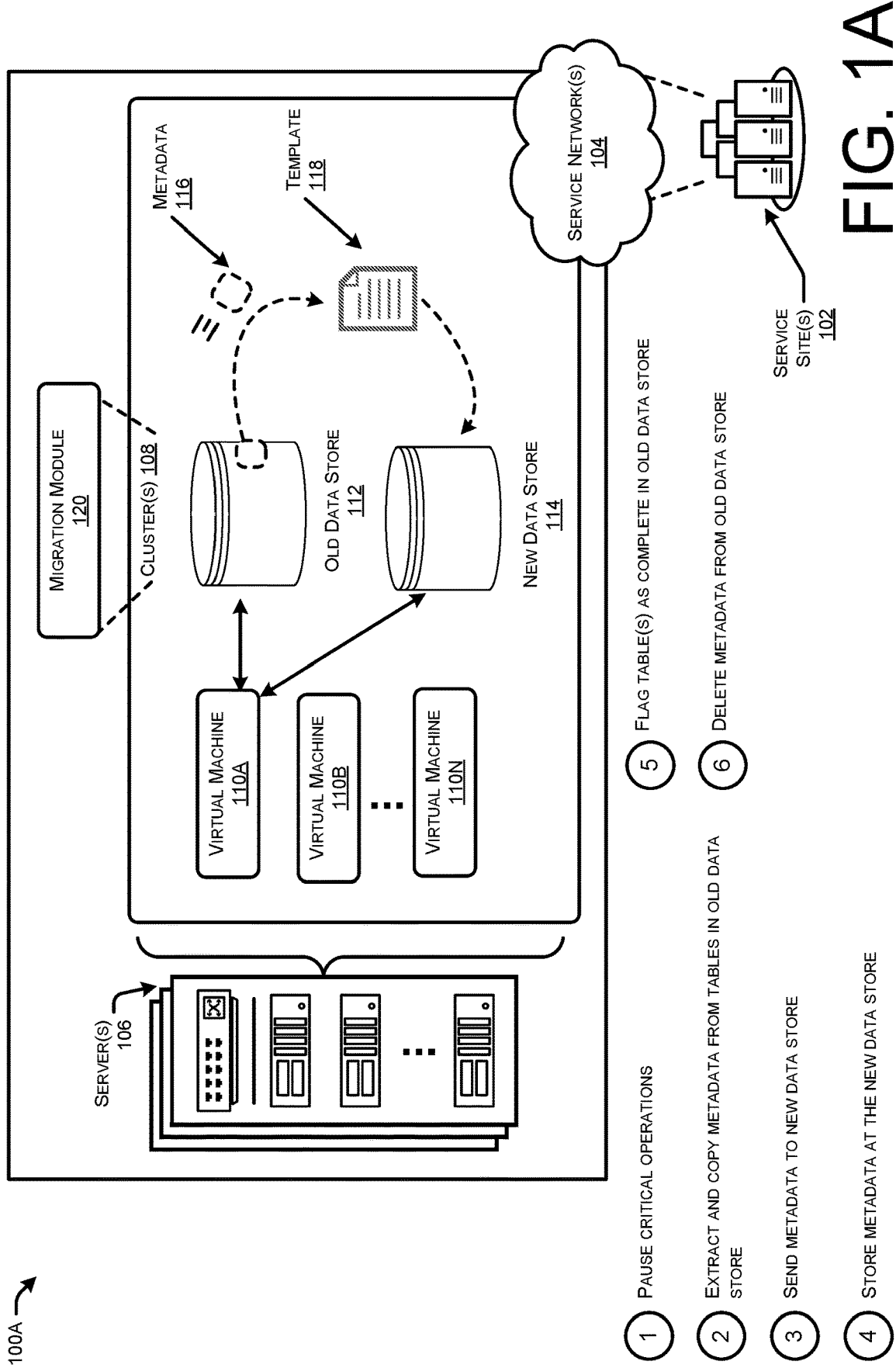

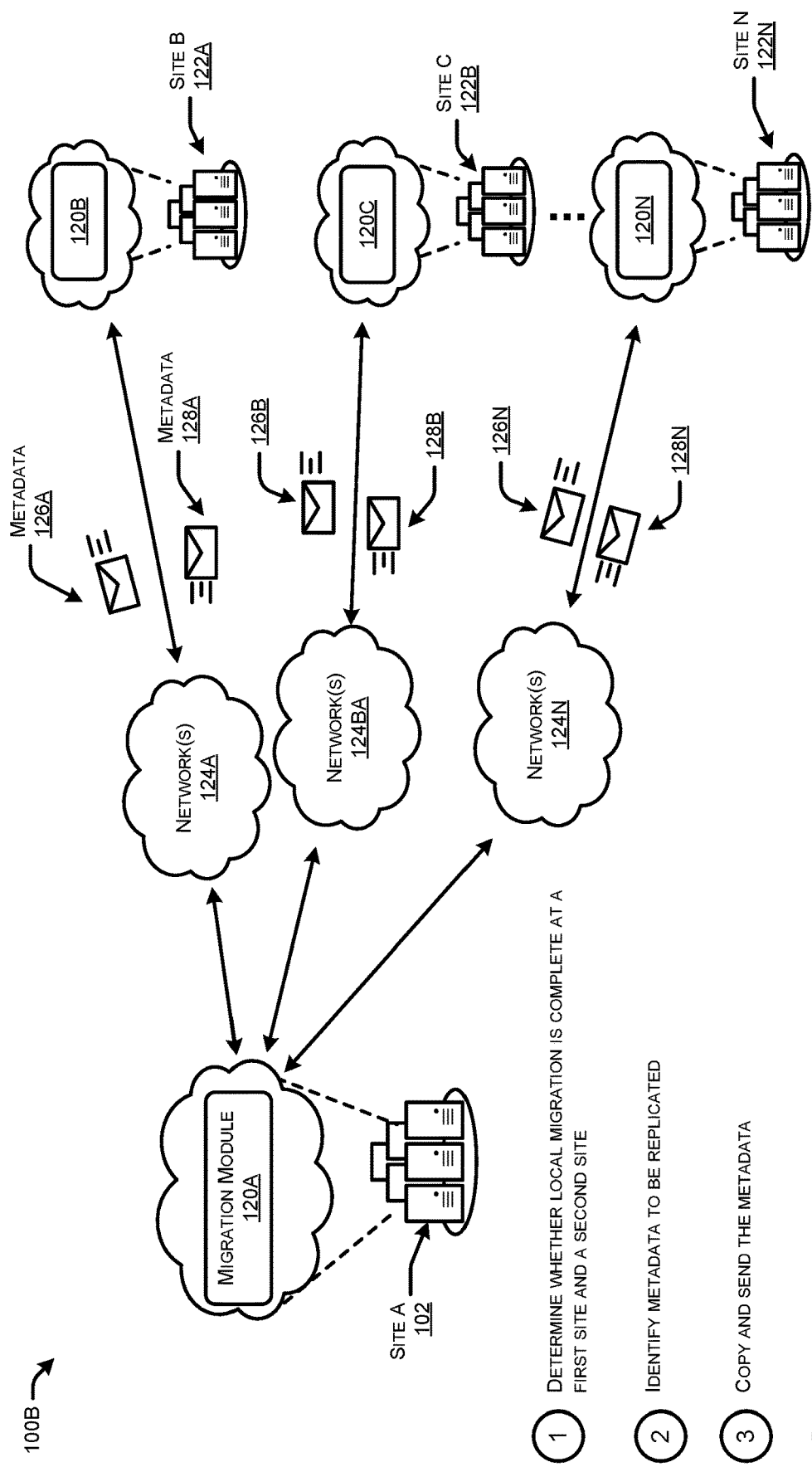

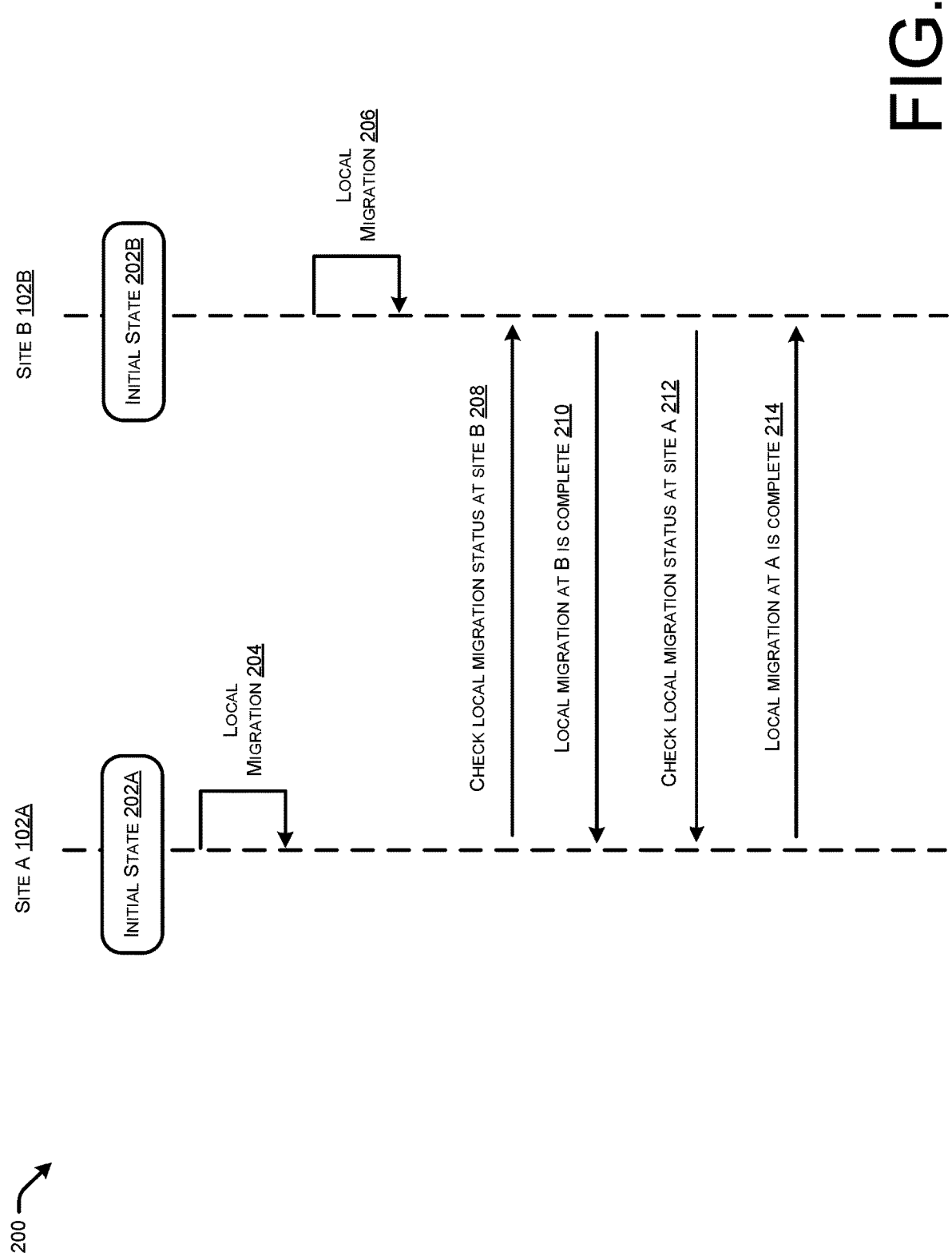

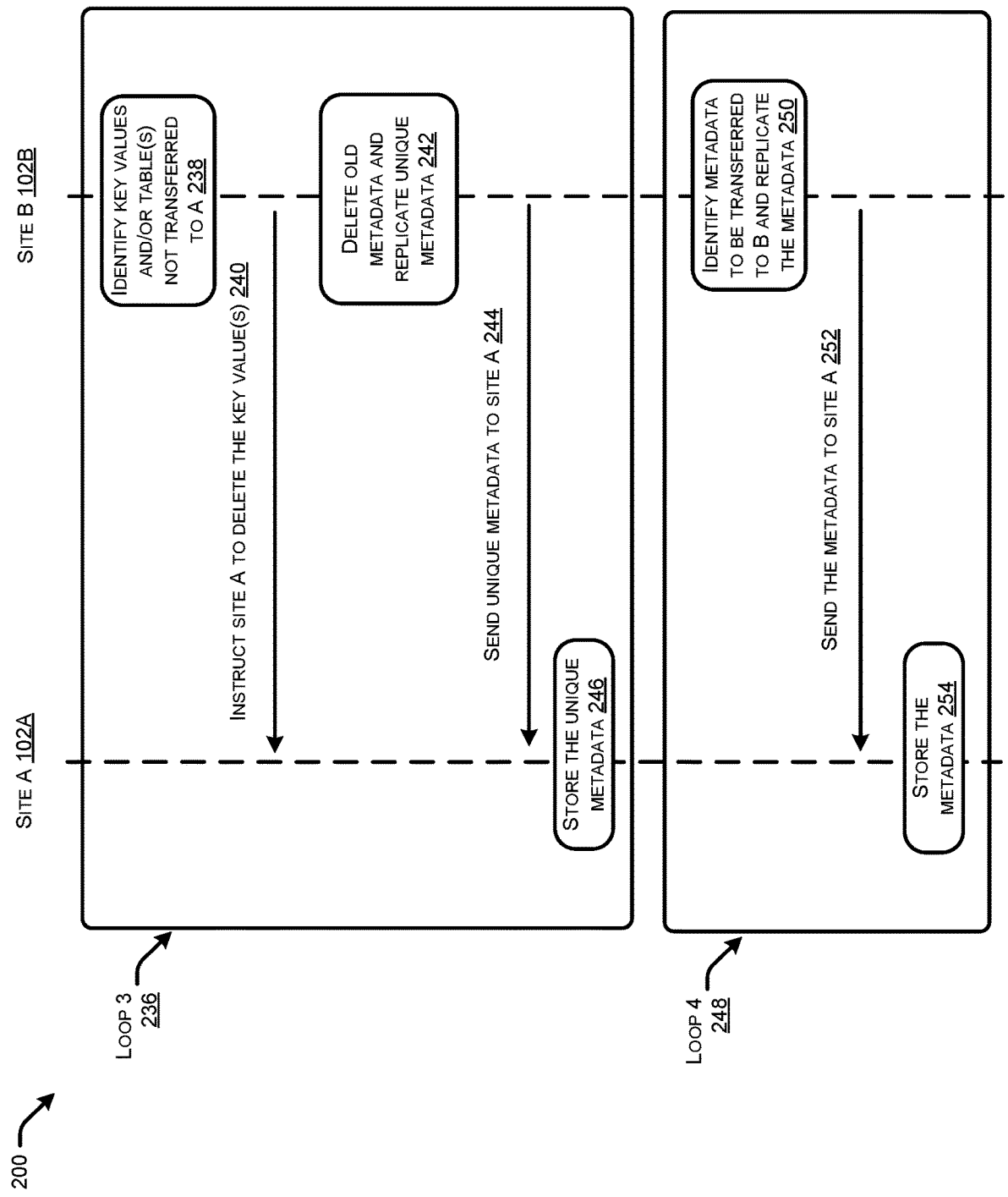

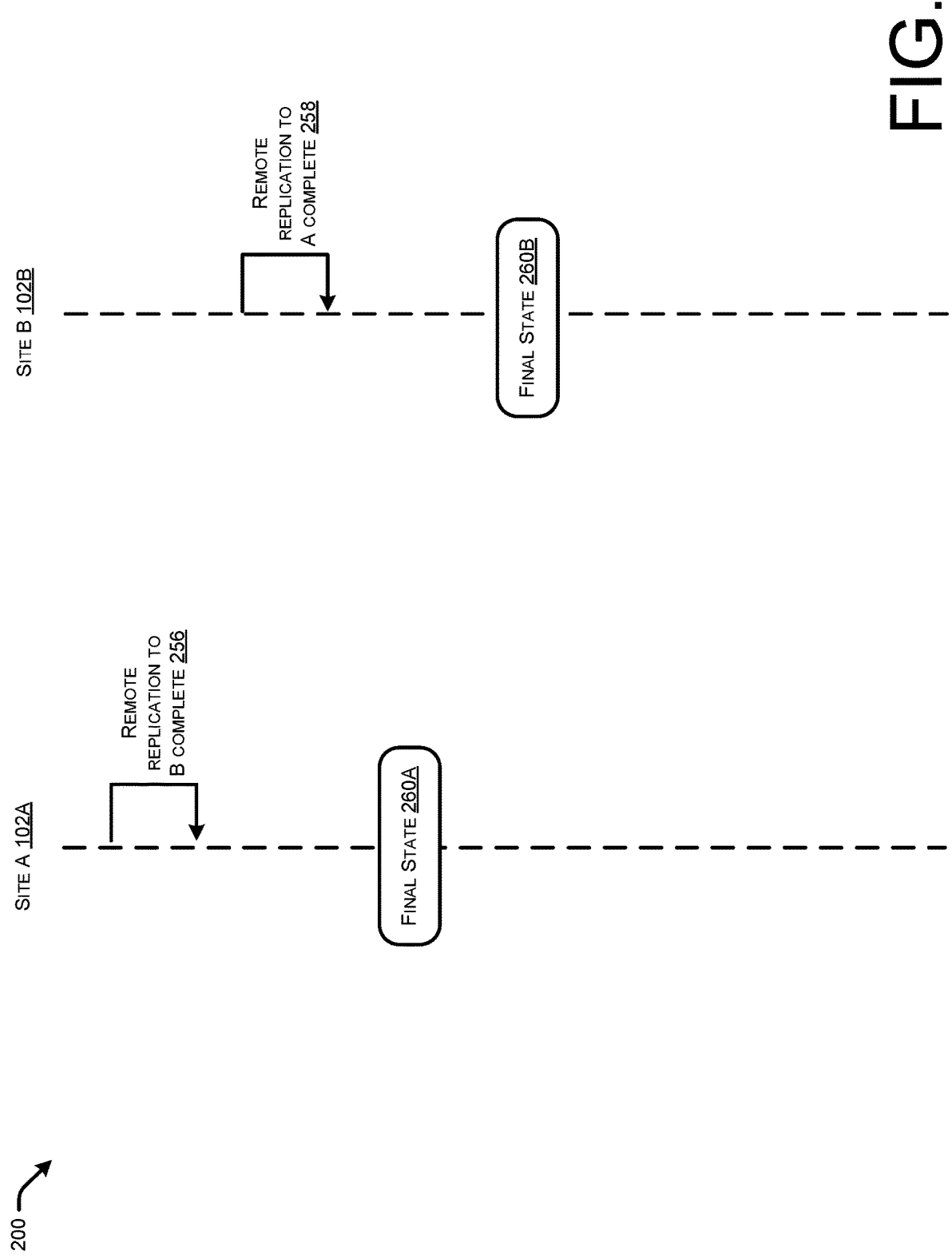

ASYNCHRONOUS METADATA REPLICATION AND MIGRATION BETWEEN COMPUTE SITES

CROSS REFERENCE TO RELATED APPLICATIONS

This application claims priority to U.S. Provisional Patent Application No. 63/331,726, filed Apr. 15, 2022, the entire contents of which are incorporated herein by reference.

TECHNICAL FIELD

The present disclosure relates generally to the field of computer networking, and more particularly to performing local migration and asynchronous remote replication of metadata between clusters.

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks. Virtualization technologies may allow a single server (or other physical computing device) to host multiple virtual computing resources. For example, a single server can host multiple instances of virtual machines (VM).

For example, Cisco's HyperFlex includes one or more systems that combine software-defined storage and data services software with Cisco unified computing system (UCS), a converged infrastructure system that integrates computing, networking and storage resources to increase efficiency and enable centralized management. Hyperflex is a disparate storage system with a firewall that targets virtual workloads, where computing resource may be scaled linearly. In the given example, Hyperflex has a wide variety of features, solutions, and products that rely on a core concept of an inventory (e.g., database) that is a persistent store for manageability. For instance, inventory may be particularly crucial for data protection service(s) associated with disaster recovery and backup service(s) provided by Hyperflex. Accordingly, ensuring the inventory has sufficient space to scale with the network is required. Additionally, ensuring that inventory is not lost is important for disaster recovery and snapshot management services.

Currently, disaster recovery services and snapshot services may utilize an external management system and/or persistent database for storing data. However, some persistent databases are unable to handle storing data for multiple data nodes (e.g., such as cluster(s) of nodes and/or data sites) as network(s) and/or service(s) grow and scale. Moreover, synchronizing inventory with an external database may result in stalling of data replication and/or loss of data and/or metadata where the connection between node(s) and the external database is dropped.

There therefore exist needs for systems and methods of providing local persistence datastores to node(s) that can scale with disaster recovery and snapshot service(s). Moreover, there exists a need for enabling disaster recovery services to be performed at any site within a system without relying on an external management system and/or persistent database.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1A illustrates a system-architecture diagram of an environment in which asynchronous local migration of metadata is performed at a service site.

FIG. 1B illustrates a system-architecture diagram of an environment in which asynchronous remote replication of metadata is performed between sites.

FIGS. 2A-2D illustrate a flow diagram of example communications for performing local migration and asynchronous remote replication of metadata between sites.

DESCRIPTION OF EXAMPLE EMBODIMENTS

Overview

Figure 2B:
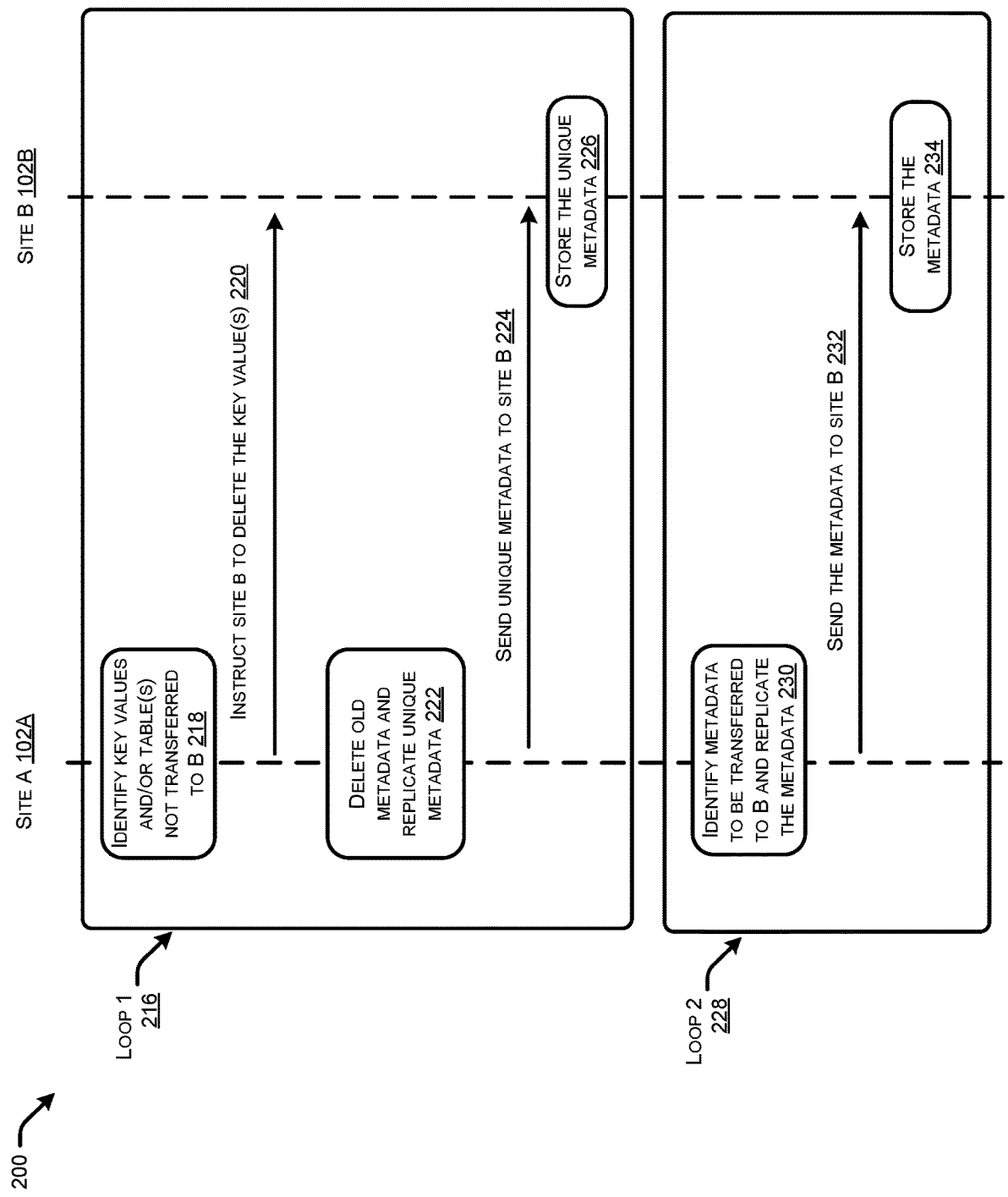

The present disclosure relates generally to techniques for performing asynchronous local migration of metadata between persistent data stores at a site and for performing asynchronous remote replication of metadata between sites.

A method to perform techniques described herein may include causing one or more critical operations associated with a first data store to pause; identifying metadata associated with one or more tables in the first data store; replicating the metadata; storing the metadata in a second data store; flagging the one or more tables as complete in the first data store; and deleting the metadata from the first data store.

Additionally, the techniques described herein may be performed by a system and/or device having non-transitory computer-readable media storing computer-executable instructions that, when executed by one or more processors, performs the method described above.

Example Embodiments

A computer network can include different nodes (e.g., network devices, client devices, sensors, and any other computing devices) interconnected by communication links and segments for sending data between end nodes. Many types of networks are available, including for example, local area networks (LANs), wide area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks. Virtualization technologies may allow a single server (or other physical computing device) to host multiple virtual computing resources. For example, a single server can host multiple instances of virtual machines (VM).

For example, Cisco's HyperFlex includes one or more systems that combine software-defined storage and data services software with Cisco unified computing system (UCS), a converged infrastructure system that integrates computing, networking and storage resources to increase efficiency and enable centralized management. Hyperflex is a disparate storage system with a firewall that targets virtual workloads, where computing resource may be scaled linearly. In the given example, Hyperflex has a wide variety of features, solutions, and products that rely on a core concept of an inventory (e.g., database) that is a persistent store for manageability. For instance, inventory may be particularly crucial for data protection service(s) associated with disaster recovery and backup service(s) provided by Hyperflex. Accordingly, ensuring the inventory has sufficient space to scale with the network is required. Additionally, ensuring that inventory is not lost is important for disaster recovery and snapshot management services.

Currently, disaster recovery services and snapshot services may utilize an external management system and/or persistent database for storing data. For instance, Cisco's Hyperflex may utilize Zookeeper as a persistent data store for node(s) in a cluster. However, some persistent databases are unable to handle storing data for multiple data nodes (e.g., such as cluster(s) of nodes and/or data sites) as network(s) and/or service(s) grow and scale. Moreover, synchronizing inventory with an external database may result in stalling of data replication and/or loss of data and/or metadata where the connection between node(s) and the external database is dropped.

For instance, in Hyperflex where Zookeeper is used as a persistent storage on a cluster of notes, the data store does not have the storage space to take in virtual workloads and/or metadata from other cluster(s) and/or site(s). Previously, metadata generated by the virtual workloads was replicated and stored in a cloud (e.g., and not at a central site and/or central cluster), which may result in disconnect between cluster(s) and/or site(s) if the connection to the cloud goes down. Moreover, the current schemes implemented for metadata replication are synchronous, which tries to keep the states at local sites and remote sites in lock step, which may result in metadata loss when the connection goes down. Further, where a new site and/or cluster is added, the new site may need to catch up with respect to the metadata of the source site, which the current synchronous scheme does not support. Moreover, current replication and migration schemes do not support changes to the persistent layer itself. For instance, where a new persistence layer is implemented that is aimed at addressing a problem in the future (e.g., such as an encryption supported persistence layer), current techniques are not able to migrate and/or replication metadata to the new persistence layer.

There therefore exists a need for systems and methods of providing local persistence datastores to node(s) that can scale with disaster recovery and snapshot service(s). Moreover, there exists a need for enabling disaster recovery services to be performed at any site within a system without relying on an external management system and/or persistent database.

This disclosure describes techniques and mechanisms for performing local migration of metadata between persistent data stores. In some examples, local migration may be performed asynchronously. For instance, the techniques may comprise causing one or more critical operations associated with a first data store to pause; identifying metadata associated with one or more tables in the first data store; replicating the metadata; storing the metadata in a second data store; flagging the one or more tables as complete in the first data store; and deleting the metadata from the first data store. Additionally, this disclosure describes techniques for performing asynchronous remote replication of metadata between sites (e.g., cluster(s) of nodes) of a service provider.

In this way, a service provider can eliminate the need for an external management system and/or persistence store in the control path for replication of data and/or metadata, thereby reducing stalls in performing replication due to connection issues and simplifying the control path at cluster(s). Moreover, the techniques described herein may enable disaster recovery services to be provided by a service provider on any of the sites associated with the service provider, without relying on an external management system and/or persistence store. By performing asynchronous remote replication of metadata between sites, the service provider may ensure disaster recovery and/or any other service can be provided on any site associated with a service, thereby streamlining services. That is, the techniques enable application-level metadata to be replicated and migrated to any N−1 site asynchronously with guaranteed reliability. Moreover, where a new persistence layer is created in the future, the techniques described herein can be implemented to replicate and migrate the metadata to the new persistence layer.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an environment 100A in which asynchronous local migration of metadata is performed at a service site 102 (also referred to as "site" herein). While the present example describes local migration being performed asynchronously, in some examples, local migration may be performed synchronously.

The one or more service site(s) 102 may correspond to one or more data centers, which may be physical facilities or buildings located across geographic areas that designated to store networked devices that are part of service network 104. The data center(s) may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the service site(s) 104 (physical and/or virtual) may provide basic resources such as processor (CPU), memory (RAM), storage (disk), and networking (bandwidth). However, in some examples the devices in the packet-forwarding networks may not be located in explicitly defined data centers, but may be located in other locations or buildings. In some examples, the service site 102 may be associated with service(s) offered by a service provider. For instance, the service site(s) 102 may correspond to one or more service(s) offered by Cisco's Hyperflex platform.

In some examples, the environment 100 may include a service network 104 that includes devices housed or located in the one or more service site(s) 102. The service network 104 may include one or more networks implemented by any viable communication technology, such as wired and/or wireless modalities and/or technologies. The service network 104 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 104 may include devices, virtual resources, or other nodes that relay packets from one network segment to another by nodes in the computer network. The service network 104 may include multiple devices that utilize the network layer (and/or session layer, transport layer, etc.) in the OSI model for packet forwarding, and/or other layers. The service network 104 may provide any type of application or service for use by users of client devices (not shown).

As illustrated in FIG. 1A, the environment 100A may include one or more server(s) 106 corresponding the service site 102 and/or service network 104. The server(s) 106 may be associated with one or more cluster(s) 108, which represent one or more data nodes associated with the service site 102. Each data node of a cluster 108 may host one or more virtual machine(s) 110. Data and/or metadata associated with a virtual machine (e.g., such as virtual machine 110A) may be stored in one or more of an old data store 112. In some examples, the data and/or metadata is stored in the old data store 112 prior to local migration being performed.

For instance, the old data store 112 may correspond to a persistent data store of an external management system. As an example, where the service site(s) 102 correspond to Cisco's Hyperflex service(s) (e.g., such as data recovery and snapshots), the old data store 112 may represent an external persistence store, such as Zookeeper. As noted above, the old data store 112 may store metadata (e.g., inventory) 116 associated with (i) one or more protected entities of Hyperflex's data protection and recovery service (e.g., such as LUNs, Volumes, Virtual Machines, and/or Groups) and/or (ii) data lineage relations of snapshots. Additional and/or alternative metadata 116 associated with any other service provided by the service provider may also be stored. In some examples, the inventory and/or metadata 116 may correspond to a key value store that includes support for nested tables to map dynamic entities. For instance, the old data store 112 and/or new data store 114 may utilize a serialization scheme format (e.g., such as Thrift) with cross-language support.

The environment 100A may also include a new data store 114. In some examples, the new data store 114 comprises a new, upgraded persistent data store that can scale with the service(s), node(s), and/or network. In some examples, the new data store may comprise a striped file system. In some examples, the new data store 114 may be local to the cluster(s) and/or node(s) of the clusters, such that a connection to an external management system (e.g., such as Zookeeper) is not required for storing and/or replicating data and/or metadata. In some examples, the new data store 114 may store data and/or metadata from the virtual machine(s) 110 after local migration occurs. For instance, the new data store 114 may correspond to a file system that support translates the key value data 116 from the old data store 112 to a new, appropriate format (e.g., such as via a template 118) in the new data store 114, such that the key value. In some examples, the new data store 114 corresponds to a persistence scheme available within the domain of the service provider, and not a general-purpose database. In some examples, the new data store 114 utilizes a file system and the template 118 corresponds to a generic template pattern (e.g., such as Scala), which may implement a serialization approach of the metadata (e.g., such as the Thrift serialization format). In some examples, the template(s) 118 may enable the metadata to be stored in the new data store 114.

Accordingly, by utilizing template(s) 118, all services provided by the site 102 (e.g., such as all VMs 110) may be simultaneously served using the old key value store (e.g., old data store 112) or the new key value store (e.g., new data store 114). In some examples, the VMs 110 and/or service(s) may be enabled to simultaneously load and manage two key value stores (e.g., the old data store 112 and/or the new data store 114), as opposed to just one (e.g., such as the old data store 112). Moreover, by utilizing template(s) 118, the techniques provide backwards compatibility for changes in a data model. For instance, where a new data model is backwards compatible, the migration module 120 may be configured to do conversions of data and/or metadata during local data migration. Further, the template(s) 118 may enable automatic conversion and migration of old meta data into a new format to any remote sites during upgrade with remote replication and synchronize existing metadata across multiple sites with remote replication. Accordingly, there is no need for additional metadata version management with the techniques described herein.

As illustrated in FIG. 1A, the cluster(s) 108 may comprise a migration module 120. In some examples, the migration module may comprise processor(s), memory, CPU, etc. In some examples the migration module 120 may be configured to perform local migration of metadata between the old data store 112 and the new data store 114. In some examples, the migration module 120 may be additionally and/or alternatively configured to perform remote replication of metadata between cluster(s) 108 and/or site(s) 102.

At "1", the migration module 120 may pause critical operation. For instance, the migration module 120 may pause write operation(s) to the old data store and/or new data store. In some examples, the critical operations may comprise one or more of write operation(s), background processing operation(s), external write operation(s), etc. In some examples, the critical operation(s) may be paused on a per table basis. For instance, where a first table in the old data store is being migrated to the new data store 114, the critical operation(s) with respect to the first table may be paused, while critical operations with respect to a second table in the old data store 112 may not be paused. For instance, the migration module 120 may pause the scheduler that updates and/or handles the inventory (e.g., metadata) to award concurrent rights to other tables while a current table is being migrated, thereby minimizing a chance that metadata may be written to a table during the migration process. In some examples, the migration module may pause the critical operations in response to receiving an indication to upgrade the storage of the site 102 and/or cluster 108.

At "2", the migration module 120 may extract and copy metadata from one or more table(s) in the old data store 112. For instance, the migration module 120 may instantiate one or more handles to the table(s) in the old data store 112 and/or the new data store 114. In some examples, the migration module 120 may extract and/or copy metadata from the old data store 112 on a per table basis (e.g., metadata from each table is copied and/or extracted sequentially). In some examples, each table in the old data store 112 may comprise a plurality of entries. Accordingly, the metadata associated with each entry may be copied and/or extracted to be sent (e.g., migrated) to the new data store 114.

At "3" the migration module may send the metadata to the new data store 114. For instance, the extracted metadata may be sent to the new data store 114 in a template 118.

At "4", the migration module may store the metadata in the new data store 114. For instance, the metadata may be transformed, using the template, into a new format. In some examples, the metadata may be stored in one or more table(s) within the new data store 114. In some examples, the metadata may be stored as key values in the new data store 114.

At "5", the migration module 120 may flag the one or more table(s) in the old data store 112 as complete. For instance, once the metadata from a first table in the old data store 112 has completed migration to the new data store, the first table may be flagged as complete, such that new metadata may not be written to the first table in the old data store. Moreover, by flagging the first table as complete once the metadata has migrated to the new data store 114, the migration module 120 may track the status of the local migration on a per table basis. Accordingly, if the local migration is interrupted, the techniques provide a reliable way of tracking the status of each table.

At "6" the migration module 120 may delete the metadata from the old data store 112. For instance, once migration of all the metadata from the old data store 112 to the new data store 114 is complete, the migration module may "clean up" the old data store 112 by deleting the old metadata and resuming critical operations to the new data store 114, such that new metadata will be written and/or stored to the new data store 114.

FIG. 1B illustrates a system-architecture diagram of an environment 100B in which asynchronous remote replication of metadata is performed between sites. As illustrated in FIG. 1B, the environment 100B may include a first site (e.g., Site A 102) that corresponds to the service site 102 described above. The environment 100B may comprise one or more additional site(s) 122. The additional site(s) 122 may comprise the same features as site 102 described in FIG. 1A above. As described above, each site 102 and/or 122 may comprise one or more cluster(s) 108 of node(s), a new data store 114, a migration module 120, among other things. In some examples, Site A 102 may comprise a central site and Site B 122A, Site C 122B, and Site N 122N may comprise one or more edge site(s). While FIG. 1B illustrates example communications between a single central site 102 (e.g., Site A 102 and multiple edge site(s) 122 (e.g., Site B, Site C, Site N), it is understood that various configurations may be used to implement the techniques described herein. For instance, example configurations may include 1-to-1, 1-to-N, N-to-1, N-to-M, or any other suitable configurations. In some examples, the techniques described herein may be applied to edge site(s) 122 replicating to two central site(s).

As illustrated in FIG. 1B, the edge site(s) 122 may communicate with the central site 102 via network(s) 124. Networks 124 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The central site 102 and edge site(s) 122 may communicate using any type of protocol, such as the transmission control protocol/Internet protocol (TCP/IP) that is used to govern connects to and over the Internet.

In the illustrated example, the central site 102 may comprise VM and/or snapshot information, but does not comprise metadata associated with the VM and/or snapshot information. In this example, the metadata may be stored at the edge site(s) 122.

At "1", the system may determine whether location migration is complete at a first site and a second site. For instance, the migration module 120A may determine that local migration at the central site 102 is complete. The migration module 120A may additionally receive an indication from one or more of the migration module(s) 120B-120N of the edge site(s) 122 that local migration at the edge site(s) 122 are complete.

At "2", the system may identify metadata to be replicated. For instance, as described in greater detail below with regard to FIGS. 2A-2D, the migration module(s) 120 may identify metadata for which a particular site is the primary authority. As an example, the migration module 120B may identify metadata for which Site B is the primary authority (e.g., that Site B originated the metadata). In this example, the migration module 120B may identify a subset of the table(s) in the new data store 114 that store key values and/or other metadata that have not been sent to Site A. For instance, the subset of table(s) may be associated with VMs and/or snapshot information.

At "3" the system copies and sends the metadata between the sites. For instance, Site B may copy and send the metadata from the subset of table(s) to Site A via network(s) 124. Site B may additionally receive other metadata from Site A that comprises metadata for which Site A is the primary authority and Site B has not previously received.

At "4", the system stores the metadata. For instance, Site A may, in response to receiving the metadata from Site B, store the metadata in the new data store 114. Site B may, in response to receiving metadata from Site A, store the metadata in a new data store at Site B.

Accordingly, asynchronous metadata replication between central and edge sites may ensure that both sites have the same view of the metadata, such that if one site goes down, recovery flows may be run from the other site.

FIGS. 2A-2D illustrate a flow diagram of example communications for performing local migration and asynchronous remote replication of metadata between sites. In some examples, Site A corresponds to a first site 102, such as a service site 102 described above. In some examples, Site B 102B corresponds to a second site and/or cluster, such as a second service site (e.g., 102 and/or 120) described above. In some examples, Site A 102A may correspond to one or more central site(s) and Site B 102B may correspond to one or more edge site(s).

While FIGS. 2A-2D illustrate example communications between two sites (e.g., Site A and Site B), it is understood that various configurations may be used to implement the techniques described herein. For instance, example configurations may include 1-to-1, 1-to-N, N-to-1, M-to-N, or any other suitable configurations.

At 202A, Site A may be in an initial state. For instance, Site A may enter the initial state in response to receiving an indication to upgrade a data store 112 at Site A.

At 202B, Site B may be in an initial state. For instance, Site B may enter the initial state in response to receiving an indication to upgrade a data store 112 at Site B.

At 204, Site A 102A may perform local migration. For instance, as described above, Site A 102A may perform local migration in response to receiving an indication to upgrade a data store 112 to a new persistent data store 114.

At 206, Site B 102B may perform local migration. For instance, as described above, Site B 102B may perform local migration in response to receiving an indication to upgrade a data store 112 to a new persistent data store 114. In some examples, local migration of metadata at Site B is independent of local migration at Site A.

At 208, Site A 102A may send a message to Site B to check a local migration status at Site B 102B. For instance, as described above, local migration may occur to upgrade a data store at Site A and/or B. Accordingly, where Site A has completed local migration, but Site B has not, Site B may not comprise the storage capacity to receive metadata from Site A. Accordingly, local migration may need to occur at both Site A and Site B in order for remote replication to be performed.

At 210, Site B 102B may send a response to Site A indicating that local migration at Site B is complete. In some examples, the message(s) between Site A and Site B may be sent according to any communication protocol. In some examples, Site A and Site B communicate via network(s) 124 described above.

At 212, Site B 102B may send a message to Site A to check a local migration status at Site B 102B.

At 214, Site A 102A may send a response to Site B indicating that local migration at Site A is complete. In some examples, the message(s) between Site A and Site B may be sent according to any communication protocol. In some examples, Site A and Site B communicate via network(s) 124 described above.

As noted above, since both Site A and Site B have completed local migration, remote replication of metadata may begin. In some examples, remote replication is performed asynchronously. In some examples, remote replication may comprise one or more loops.

As illustrated in FIG. 2B, at 216, a first loop (e.g., Loop 1 216) may be initiated where an interruption has occurred with a previous transfer of metadata and/or key values. For instance, at 218, Site A may identify key value(s) (e.g., metadata) and/or table(s) where (i) Site A is the primary authority and (ii) the key value(s) and/or table(s) have not completely been transferred to Site B.

At 220, Site A may send Site B a message instructing Site B to delete the previous key value(s) (e.g., metadata) associated with the interrupted transfer. In response, Site B may delete the key value(s) and/or metadata identified in the message from a data store 114.

At 222, Site A may delete any metadata it determines and/or considers to be obsolete. For instance, a migration module 120 at Site A may delete metadata that is no longer up to date. Site A may identify and replicate unique metadata (e.g., most up to date metadata stored in the table(s) being migrated to Site B).

At 224, Site A may send the unique metadata to Site B. For instance, Site A may send the metadata as part of a packet and/or template 118. In some examples, the metadata may be encrypted using any appropriate encryption protocol.

At 226, Site B may, in response to receiving the metadata from Site A, store the metadata in one or more table(s) of the data store 114.

By performing local migration of metadata asynchronously, we can apply optimizations to batch a set of key value pairs to minimize network calls and/or streaming to minimize memory footprint. For instance, by pausing the critical operations, the techniques described here may minimize the rate of catch up of metadata write operations, such as by using a quiescing scheme.

As illustrated in FIG. 2B, a second loop (e.g., Loop 2 228) may be associated with remote replication. In some examples, Loop 2 228 may be initiated prior to Loop 1 216, such as in response to determining that both Site A and Site B have completed local migration.

At 230, Site A may identify metadata to be transferred to Site B. For instance, as described above, a migration module at Site A may identify metadata for which Site A is a primary authority and that has not been replicated to Site B. For instance, the metadata may correspond to a subset of tables stored in a data store 114 at Site A. Based at least in part on identifying the metadata, Site A may replicate the metadata for sending to Site B. As described above, the metadata may comprise key values.

At 232, Site A may send the metadata to Site B. For instance, Site A may send the metadata as part of a packet and/or template 118. In some examples, the metadata may be encrypted using any appropriate encryption protocol.

At 234, Site B may store the metadata from Site A in a data store 114 at Site B. In some examples, the steps of Loop 2 may be performed until all of the metadata identified at 230 is replicated to Site B. In some examples, such as where an interruption in the replication of metadata from Site A to Site B occurs, the steps of Loop 1 216 may be initiated. Where no interruption occurs, the process may continue to the steps of Loop 3 and/or Loop 4 described below.

As illustrated in FIG. 2C, at 236, a third loop (e.g., Loop 3 236) may be initiated where an interruption has occurred with a previous transfer of metadata and/or key values from Site B to Site A.

For instance, at 238, Site B may identify key value(s) (e.g., metadata) and/or table(s) where (i) Site B is the primary authority and (ii) the key value(s) and/or table(s) have not completely been transferred to Site A.

At 240, Site B may send Site A a message instructing Site A to delete the previous key value(s) (e.g., metadata) associated with the interrupted transfer. In response, Site A may delete the key value(s) and/or metadata identified in the message from a data store 114 at Site A.

At 242, Site B may delete any metadata it determines and/or considers to be obsolete. For instance, a migration module 120 at Site B may delete metadata that is no longer up to date. Site B may identify and replicate unique metadata (e.g., most up to date metadata stored in the table(s) being migrated to Site A).

At 244, Site B may send the unique metadata to Site A. For instance, Site B may send the metadata as part of a packet and/or template 118. In some examples, the metadata may be encrypted using any appropriate encryption protocol.

At 246, Site A may, in response to receiving the metadata from Site B, store the metadata in one or more table(s) of the data store 114.

As illustrated, a fourth loop (e.g., Loop 4 248) may be associated with remote replication. In some examples, Loop 4 248 may be initiated prior to Loop 3 236, such as in response to determining that Loop 1 216 and/or Loop 2 228 has been completed.

At 250, Site B may identify metadata to be transferred to Site A. For instance, as described above, a migration module at Site B may identify metadata for which Site B is a primary authority and that has not been replicated to Site A. For instance, the metadata may correspond to a subset of tables stored in a data store 114 at Site B. Based at least in part on identifying the metadata, Site B may replicate the metadata for sending to Site A. As described above, the metadata may comprise key values.

At 252, Site B may send the metadata to Site A. For instance, Site B may send the metadata as part of a packet and/or template 118. In some examples, the metadata may be encrypted using any appropriate encryption protocol At 254, Site A may store the metadata from Site B in a data store 114 at Site A. In some examples, the steps of Loop 4 may be performed until all of the metadata identified at 250 is replicated to Site A. In some examples, such as where an interruption in the replication of metadata from Site B to Site A occurs, the steps of Loop 3 236 may be initiated. Where no interruption occurs, the process may continue to 256.

As illustrated in FIG. 2D, at 256, Site A may determine that remote replication to Site B is complete. For instance, remote replication may be complete once each loop (e.g., Loops 1-4) has been completed. In some examples, Site A may store an indication that the remote replication has been completed.

At 258, Site B may determine that remote replication to Site A is complete. For instance, remote replication may be complete once each loop (e.g., Loops 1-4) has been completed. In some examples, Site B may store an indication that the remote replication has been completed.

At 260A, Site A may enter a final state and the workflow may terminate.

At 260B, Site B may enter a final state and the workflow may terminate.

Accordingly, the techniques described herein may enable disaster recovery services to be provided by a service provider on any of the sites associated with the service provider, without relying on an external management system and/or persistence store. By performing asynchronous remote replication of metadata between sites, the service provider may ensure disaster recovery and/or any other service can be provided on any site associated with a service, thereby streamlining services. That is, the techniques enable application-level metadata to be replicated and migrated to any N−1 site asynchronously with guaranteed reliability. Moreover, where a new persistence layer is created in the future, the techniques described herein can be implemented to replicate and migrate the metadata to the new persistence layer.

Figure 3:
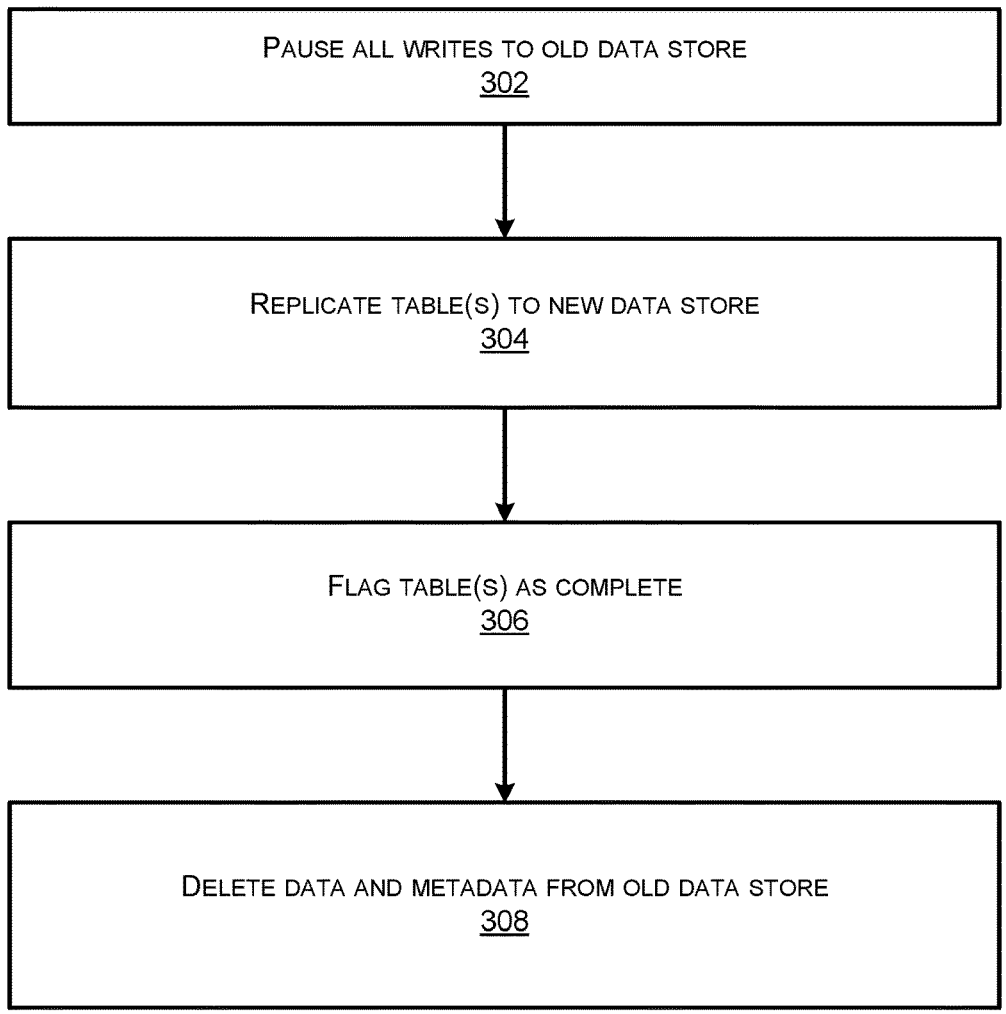
FIG. 3 illustrates an example environment including a template that may be included in a network packet generated by a network device.

FIG. 3 illustrates a flow diagram of an example method 300 for performing local migration of metadata. In some instances, the steps of method 300 may be performed by a system (e.g., migration module 120) and/or device (e.g., a cluster 108) that includes one or more processors and one or more non-transitory computer-readable media storing computer-executable instructions that, when executed by the one or more processors, cause the one or more processors to perform operations of method 300.

At 302, the system may pause all writes to the old data store. For instance, the system may pause all critical operations (e.g., write operations, scheduler operations, etc.) associated with one or more table(s) in the old data store. In some examples, the old data store corresponds to Zookeeper. In some examples, pausing the writes and/or critical operations may occur in response to receiving an instruction to upgrade the old data store 112. For instance, the system may receive the instruction from the Hyperflex system.

Accordingly, as read and write operations are now asynchronous, the system may apply optimizations to a batch set of key value pairs (e.g., metadata), thereby minimizing network calls and/or streaming to minimize a memory footprint. For instance, by suspending all activity prior to local migration, the techniques described herein enable the system to enter a quiesced state, minimizing the need for catch up workflows.

At 304, the system may replicate table(s) from the old data store 112 to the new data store. For instance, as described above, the old data store may comprise a plurality of table(s), each respective table having one or more entries. The system may identify and replicate the metadata (e.g., inventory and/or key value(s)) from each table(s) in the old data store sequentially. The system may store the metadata in the new data store. For instance, the new data store may correspond to the new data store 114 described above. As described above, replicating the metadata may comprise extracting the metadata from the table(s) of the old data store 112 and storing the metadata as part of a template 118 (e.g., using a Thrift serialization format). The system may store the metadata in table(s) of the new data store 114 in a new format and/or a different format from which the metadata is stored in the old data store 112 and/or the template 118 (e.g., such as Scala). In some examples, the system may convert the metadata from the first format associated with the old data store to a second format associated with the new data store (e.g., such as using the template 118).

At 306, the system may flag table(s) as complete. For instance, the system may flag a table in the old data store as complete when all the metadata from the table has been migrated to the new data store. In some examples, the system may return to step 304 until all the metadata from the old data store 112 has been replicated to the new data store 114.

At 308, the system may delete the data and metadata from the old data store. For instance, as described above, once all of the metadata and/or data from the old data store has been migrated to the new data store, the system may "clean up" the old data store by deleting the metadata and/or data store in the old data store.

Figure 4:
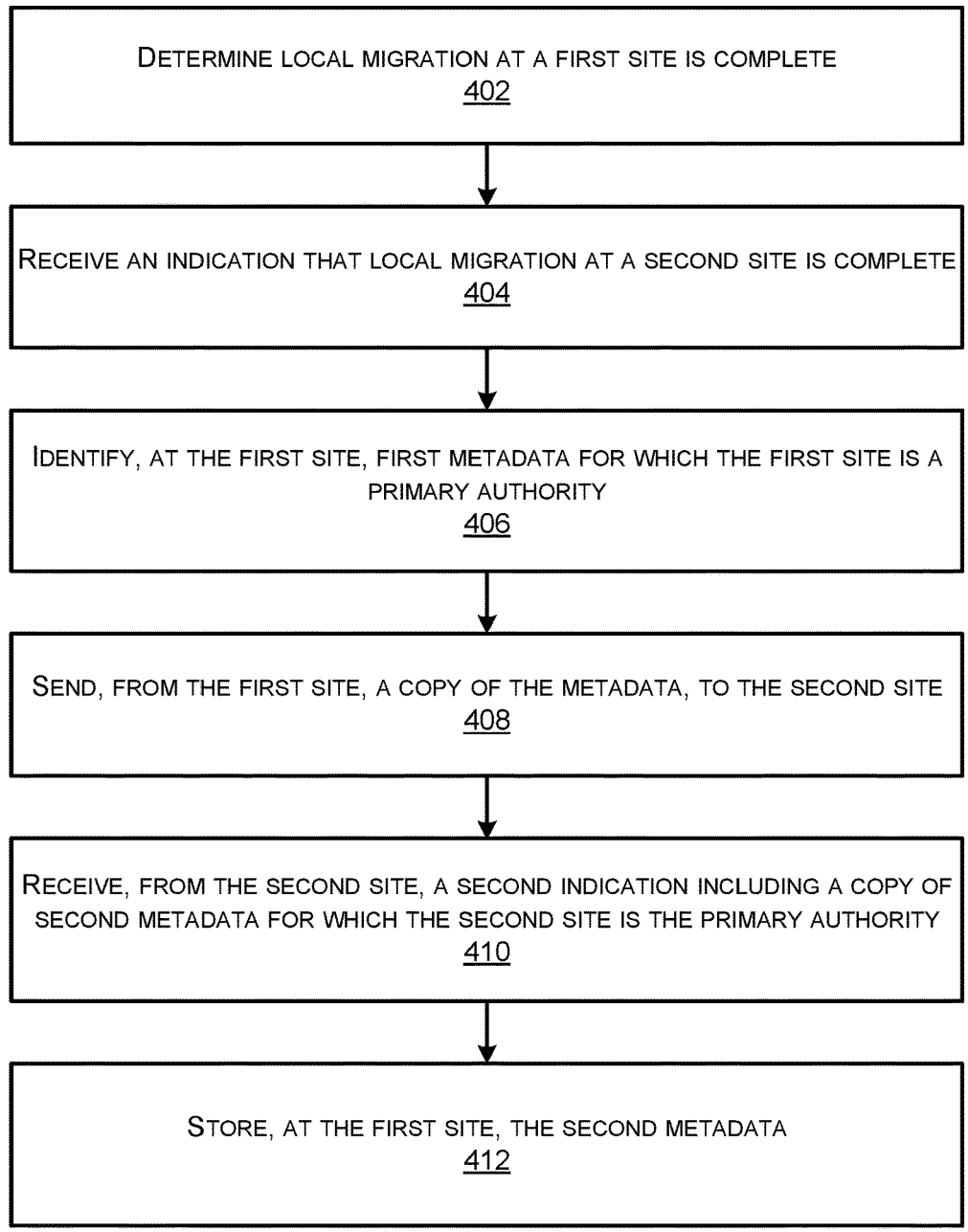
FIG. 4 illustrates a flow diagram of an example method for a system to perform remote replication of metadata between sites.

FIG. 4 illustrates a flow diagram of an example method 400 for a system to perform remote replication of metadata between sites. In some instances, the techniques may be performed by a system (e.g., one or more devices), a module (e.g., migration module 120), a combination thereof, and/or any other devices (e.g., hardware offload chips and/or any other device). In some examples, the steps of FIG. 4 may be performed at a service site 102, such as a central site 102 and/or an edge site 122.

At 402, the system may determine that local migration at a first site is complete. For instance, the first site may correspond to Site A described above.

At 404, the system may receive an indication that local migration at a second site is complete. For instance, as described above the second site may correspond to another central site and/or one or more edge sites.

At 406, the system may, identify, at the first site, first metadata for which the first site is a primary authority. For instance, where the first site corresponds to Site A, the system may perform Loop 1 and/or Loop 2 described in FIGS. 2A-2D above.

At 408, the system may send, from the first site, a copy of the metadata to the second site. As noted above, the system may send the metadata using any appropriate communication protocol and/or encryption protocol.

At 410, the system may receive, from the second site, a second indication including a copy of second metadata for which the second site is the primary authority. For instance, where the second site corresponds to Site B, the second site may perform one or more of Loop 3 and/or Loop 4 described in FIGS. 2A-2D above.

At 412, the system may store, at the first site, the second metadata. For instance, the system may store the second metadata in a new data store 114 at the first site.

Figure 5:
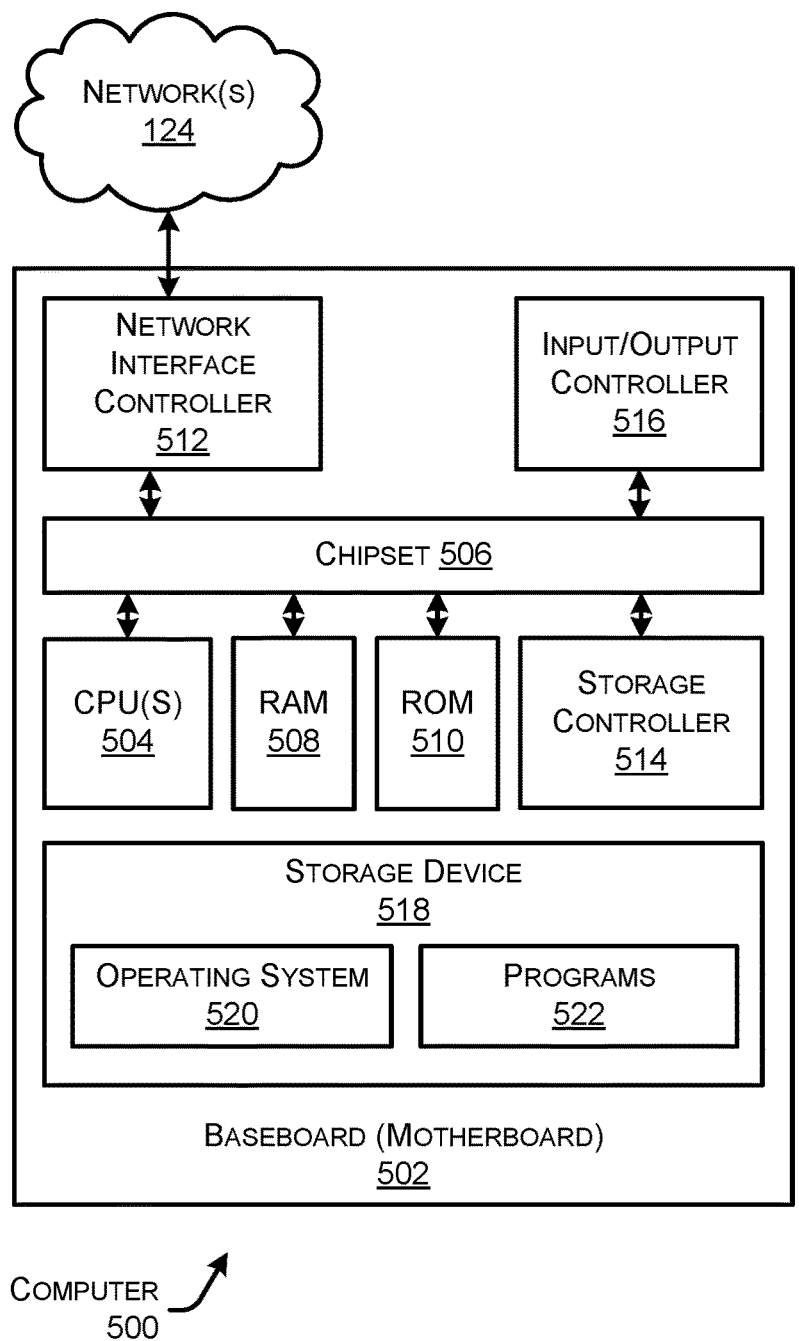
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a cluster 108, a migration module 120, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as service network(s) 104 and/or network(s) 124. The chipset 506 can include functionality for providing network connectivity through a NIC 512, such as a gigabit Ethernet adapter. The NIC 512 is capable of connecting the computer 500 to other computing devices over the network(s) 124. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the migration module 120, and/or any components included therein, may be supported by one or more devices similar to computer 500. Stated otherwise, some or all of the operations performed by a migration module 120, and/or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a migration module 120, and/or any other device.

The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the migration module 120, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for performing asynchronous local migration of metadata between data stores at a site and asynchronous remote replication of metadata between sites. For instance, the programs 522 may cause the computer 500 to perform techniques for asynchronous local migration at a first site, including pausing critical operation(s) at an old data store, copying metadata from the old data store to a new data store, flagging table(s) in the old data store as complete, and deleting the metadata from the old data store. Additionally and/or alternatively, the programs 522 may comprise instructions that cause the computer 500 to perform the specific techniques for performing asynchronous remote replication of metadata between sites.

In this way, a service provider can eliminate the need for an external management system and/or persistence store in the control path for replication of data and/or metadata, thereby reducing stalls in performing replication due to connection issues and simplifying the control path at cluster(s). Moreover, the techniques described herein may enable disaster recovery services to be provided by a service provider on any of the sites associated with the service provider, without relying on an external management system and/or persistence store. By performing asynchronous remote replication of metadata between sites, the service provider may ensure disaster recovery and/or any other service can be provided on any site associated with a service, thereby streamlining services. That is, the techniques enable application-level metadata to be replicated and migrated to any N−1 site asynchronously with guaranteed reliability. Moreover, where a new persistence layer is created in the future, the techniques described herein can be implemented to replicate and migrate the metadata to the new persistence layer.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least in part by a migration module of a first site comprising:
    causing one or more critical operations associated with a first data store to pause;
    identifying metadata associated with one or more tables in the first data store;
    performing a first local migration at the first site, the first local migration including:
        replicating the metadata; and
        storing the metadata in a second data store;
    flagging the one or more tables as complete in the first data store;
    deleting the metadata from the first data store;
    determining that the first local migration at the first site is complete;
    receiving, from a second site, an indication that a second local migration at the second site is complete;
    identifying second metadata within the second data store for which the first site is a primary authority;
    sending, to the second site, a first message including the second metadata;
    receiving, from the second site, a second message including third metadata for which the second site is the primary authority; and
    storing, in the second data store, the third metadata.

2. The method of claim 1, wherein the metadata comprises key value data.

3. The method of claim 1, wherein the metadata is replicated from the one or more tables sequentially.

4. The method of claim 1, wherein replicating the metadata comprises:
    replicating the metadata in a first format associated with the first data store; and
    storing the metadata in a template corresponding to the first format.

5. The method of claim 4, wherein storing the metadata in the second data store further comprises:
    converting the metadata from first format associated with the first data store to a second format associated with the second data store; and
    storing the metadata in the second data store in the second format.

6. The method of claim 1, wherein causing the one or more critical operations to pause occurs in response to receiving an instruction to upgrade the first data store.

7. The method of claim 1, wherein the first site comprises at least one of (i) one or more central sites or one or (ii) more edge sites and the second site comprises at least one of (i) one or more second central sites or (ii) one or more additional edge sites.

8. A system comprising:
    one or more processors; and
    one or more non-transitory computer-readable media storing computer-executable instructions that, when executed by the one or more processors, cause the one or more processors to perform operations comprising:
        causing, by a migration module of a first site, one or more critical operations associated with a first data store to pause;
        identifying, by the migration module, metadata associated with one or more tables in the first data store;
        performing a first local migration at the first site, the first local migration including:
            replicating, by the migration module, the metadata; and
            storing, by the migration module, the metadata in a second data store;
        flagging, by the migration module, the one or more tables as complete in the first data store;
        deleting, by the migration module, the metadata from the first data store;
        determining, by the migration module, that the first local migration at the first site is complete;
        receiving, by the migration module and from a second site, an indication that local migration at the second site is complete;
        identifying, by the migration module, second metadata within the second data store for which the first site is a primary authority;
        sending, from the migration module and to the second site, a message including the second metadata;
        receiving, by the migration module and from the second site, a second message including third metadata for which the second site is the primary authority; and
        storing, by the migration module and in the second data store, the third metadata.

9. The system of claim 8, wherein the metadata comprises key value data.

10. The system of claim 8, wherein the metadata is replicated from the one or more tables sequentially.

11. The system of claim 8, wherein replicating the metadata comprises:
    replicating, by the migration module, the metadata in a first format associated with the first data store; and
    storing, by the migration module, the metadata in a template corresponding to the first format.

12. The system of claim 11, wherein storing the metadata in the second data store further comprises:
    converting, by the migration module, the metadata from first format associated with the first data store to a second format associated with the second data store; and
    storing, by the migration module, the metadata in the second data store in the second format.

13. The system of claim 8, wherein causing the one or more critical operations to pause occurs in response to receiving an instruction to upgrade the first data store.

14. The system of claim 8, wherein the first site comprises at least one of (i) one or more central sites or (ii) one or more edge sites and the second site comprises at least one of (i) one or more second central sites or (ii) one or more additional edge sites.

15. One or more non-transitory computer-readable media storing computer-readable instructions that, when executed by one or more processors, cause the one or more processors to perform operations comprising:
    causing, by a migration module of a first site, one or more critical operations associated with a first data store to pause;
    identifying, by the migration module, metadata associated with one or more tables in the first data store;
    performing a first local migration at the first site, the first local migration including:
        replicating, by the migration module, the metadata; and
        storing, by the migration module, the metadata in a second data store;
    flagging, by the migration module, the one or more tables as complete in the first data store;
    deleting, by the migration module, the metadata from the first data store;

determining, by the migration module, that the first local migration at the first site is complete;

receiving, by the migration module and from a second site, an indication that local migration at the second site is complete;

identifying, by the migration module, second metadata within the second data store for which the first site is a primary authority;

sending, from the migration module and to the second site, a message including the second metadata;

receiving, by the migration module and from the second site, a second message including third metadata for which the second site is the primary authority; and storing, by the migration module and in the second data store, the third metadata.

16. The one or more non-transitory computer-readable media of claim 15, wherein replicating the metadata comprises:

replicating, by the migration module, the metadata in a first format associated with the first data store; and storing, by the migration module, the metadata in a template corresponding to the first format.

17. The one or more non-transitory computer-readable media of claim 16, wherein storing the metadata in the second data store further comprises:

converting, by the migration module, the metadata from first format associated with the first data store to a second format associated with the second data store; and storing, by the migration module, the metadata in the second data store in the second format.

* * * * *